United States Patent
Fujii et al.

(10) Patent No.: US 6,721,265 B1
(45) Date of Patent: Apr. 13, 2004

(54) HIGH-DENSITY OPTICAL INFORMATION RECORDING MEDIUM AND A SUBSTRATE AND A STAMPER FOR THE MANUFACTURE THEREOF

(75) Inventors: Toru Fujii, Tokyo (JP); Toshiaki Tajima, Tokyo (JP); Yuji Tomizawa, Tokyo (JP); Ryou Negishi, Tokyo (JP); Emiko Hamada, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/506,915

(22) Filed: Feb. 18, 2000

(30) Foreign Application Priority Data

Feb. 19, 1999 (JP) .......................................... 11-040938

(51) Int. Cl.$^7$ ................................................ G11B 7/24
(52) U.S. Cl. .................................... 369/275.4; 428/64.4
(58) Field of Search ........................ 369/275.4, 275.3, 369/275.1, 277, 279, 283, 275.2, 272; 428/64.4, 64.1, 64.5, 64.6, 64.9

(56) References Cited

U.S. PATENT DOCUMENTS

| | | | |
|---|---|---|---|
| 5,635,267 A | * | 6/1997 | Yamada et al. ............ 428/64.4 |
| 5,745,475 A | * | 4/1998 | Ohno et al. ............... 369/275.4 |
| 5,972,459 A | * | 10/1999 | Kawakubo et al. ......... 428/64.1 |
| 6,071,588 A | * | 6/2000 | Nobumasa et al. ......... 428/64.4 |
| 6,128,271 A | * | 10/2000 | Ohta ........................ 369/275.4 |
| 6,269,070 B1 | * | 7/2001 | Kikuchi et al. ........... 369/275.4 |
| 6,452,899 B1 | * | 9/2002 | Fujii et al. ................ 369/275.4 |

* cited by examiner

Primary Examiner—Ali Neyzari
(74) Attorney, Agent, or Firm—Katten Muchin Zavis Rosenman

(57) ABSTRACT

An optical information recording medium enables accurate tracking servo throughout the recording area including inner and outer peripheral region by way of reducing the differences between the amplitudes of the push-pull signals from those regions. The medium comprises a light transmitting substrate, a tracking groove formed on a surface of the light transmitting substrate, a recording layer formed on the surface of the substrate having the groove, and a reflective layer, formed on the recording layer, for reflecting recording and reproducing laser beams. The width of the groove at the outer peripheral region is made smaller than that at the inner peripheral region. Specifically, the ratio of the width at the outer peripheral region to that at the inner peripheral region is set to be greater than or equal to 0.8.

19 Claims, 5 Drawing Sheets

HIGH-DENSITY OPTICAL INFORMATION RECORDING MEDIUM AND A SUBSTRATE AND A STAMPER FOR THE MANUFACTURE THEREOF

FILED OF THE INVENTION

The present invention relates to an optical information medium capable of recording optically readable information; and, more particularly, to an optimum optical information recording medium adapted for use in recording and reproducing high-density optical information by using red laser beams having short wavelengths in the range from 630 to 670 nm.

DESCRIPTION OF THE PRIOR ART

A digital versatile disc (DVD) capable of recording and reproducing high-density information has been put into practical use by the help of the recent development and practical utilization of a laser having a short wavelength. In DVD, there are provided an information recording area on at least one main surface thereof, a plurality of pits retaining recorded information and formed on the information recording area, and a reflective layer formed of a metal film and provided on the whole information recording area.

In order to implement the recording and reproduction of high-density information in DVD, DVD standards are established, which are different from those of the compact disc (CD), currently the most widely used optical information medium. For instance, in order to prevent bending or warping of a disc (i.e., in order to decrease the influence of tilt from optical axis), the DVD employs a substrate having a thickness of 0.6 mm, which is approximately a half of that of the CD. In addition, for the dimensional compatibility with the conventional CD of 1.2 mm, the DVD adopts a structure in which two discs are bonded together. According to the standards of the DVD, one DVD disc is required to have a maximum recording capacity of about 4.7 GB, big enough to record video and audio information for an average running time of about 133 min.

In the DVD standards, there exist needs to develop a recordable optical information medium and a recording technique thereof, which has the physical and optical compatibility with read-only DVDs, such as a DVD-Video storing prerecorded video information and a DVD-ROM storing prerecorded computer program or data, and is capable of having the high-density recording capability of maximum 4.7 GB.

The DVD described above has a track pitch of 0.74 $\mu$m and a minimum pit size of 0.4 $\mu$m (or 0.44 $\mu$m in the case of a DVD having dual recording layers); and, therefore, it is possible to achieve higher density recording in DVD than in CD having a track pitch of 1.6 $\mu$m and a minimum pit size of 0.83 $\mu$m.

The substrate of a recordable DVD is formed by, e.g., a suitable molding method such as an injection molding technique, wherein the substrate is conventionally formed through the use of a stamper whose groove shape is identical throughout the inner to the outer peripheral regions thereof. In injection molding the substrate using such a stamper, filling properties of a resin tend to be different from the inner to the outer peripheral region even in the case where molding conditions, such as pressure, resin temperature and the like, are optimally controlled. That is, since the track pitch and the width of the groove on the substrate of the recordable DVD are smaller than those on the substrate of the CD, the groove of the stamper used in forming the substrate of the recordable DVD can be fully filled with the resin at the inner peripheral region of the stamper, whereas the groove of the stamper may not be completely filled at the outer peripheral region thereof, resulting in deteriorated transferability of the stamper shape at the outer peripheral region. As a result, edges of the land at the outer peripheral region of the substrate fabricated as described above are bound to be rounded due to insufficient filling of the resin and thus sloping angles of the groove become smaller, resulting in the shallower and wider groove at that region.

In DVD, it is required that the difference $\Delta PP$ between the maximum and the minimum amplitudes of the push-pull signals for proper tracking servo be within 15% of a reference value determined by the push-pull signals. The amplitude difference $\Delta PP$ between push-pull signals required for accurate tracking servo may be defined as:

$$\Delta PP = (PP_{MAX} - PP_{MIN})/(PP_{MAX} + PP_{MIN})$$

wherein $PP_{MAX}$ and $PP_{MIN}$ represent the maximum and the minimum amplitudes of push-pull signals from a non-recording region of the DVD, respectively. However, in such an optical information recording medium having a land with rounded edges at the outer peripheral region, the push-pull signals from the outer peripheral region become smaller than those from the inner peripheral region. This is because ideal diffraction conditions cannot be met at the outer peripheral region where the groove is shallower and wider and sloping angles of the side surfaces of the groove are small due to the land with rounded edges.

SUMMARY OF THE INVENTION

It is, therefore, a primary object of the present invention to provide an optical information recording medium capable of recording optically readable high-density signals thereon, wherein amplitude differences between push-pull signals from an inner and an outer peripheral regions of the medium are reduced, thereby enabling accurate tracking to be performed throughout the inner and the outer peripheral regions.

Another object of the present invention is to provide a substrate capable of implementing a well-defined groove thereon, thereby enabling ideal diffraction conditions to be obtained.

Still another object of the present invention is to provide a stamper having an improved transferability for providing a substrate having a well-defined groove thereon.

In the course of addressing the drawbacks of the prior art, the inventors of the present invention have found that amplitudes of push-pull signals for tracking servo are determined depending on the stamper transferability to a substrate established at the time of injection molding the substrate. In particular, the inventors have found that the stamper transferability can be improved and a well-defined land and groove can be obtained by modifying the groove at the outer peripheral region of the stamper to have a shape to be easily filled with a resin.

Therefore, in accordance with the present invention, widths of the groove and sloping angles of the sides thereof are made to be different from the inner to the outer peripheral region, enabling the substantially identical stamper transferability to be obtained at the inner and the outer peripheral regions at the time of injection molding a light transmitting substrate. As a result, amplitude differences between push-pull signals for tracking servo can be reduced and accurate tracking servo can be performed throughout the inner and the outer peripheral regions of the optical information recording medium.

In accordance with the present invention, there is provided an optical information recording medium comprising:

a light transmitting substrate for transmitting a recording laser beam therethrough;

a tracking groove formed on a surface of the light transmitting substrate;

a recording layer formed on the surface and the tracking groove; and a reflective layer, formed on the recording layer, for reflecting recording laser beam, wherein optically readable signals are recorded by the recording laser beam irradiated through the light transmitting substrate.

Further, widths of the groove at the outer peripheral region of the light transmitting substrate are smaller than those at the inner peripheral region of the substrate.

By making the widths of the groove at the outer peripheral region of the light transmitting substrate smaller than those at the inner peripheral region thereof, the land at the outer peripheral region is widened and thus can be easily filled by a resin during injection molding. As a result, rounded edges of the land and the shallow and wide groove due to insufficient filling of the resin at the outer peripheral region of the light transmitting substrate can be prevented and thus amplitude differences of the push-pull signals for tracking servo due to varying diffractions of the laser beam at the inner and the outer peripheral regions can be also reduced.

Specifically, it is preferrable that a ratio of the width of the tracking groove at the outer peripheral region of the light transmitting substrate to that at the inner peripheral region thereof is greater than or equal to about 0.8. If the ratio is greater than or equal to about 0.8 but less than 1, the amplitude differences between the push-pull signals become within about ±15% of the average of the maximum and the minimum amplitude values of the push-pull signals, satisfying conditions required for accurate tracking servo.

In addition, in accordance with the present invention, the sloping angles of both sides of the tracking groove with respect to the plane of incidence of the recording laser beam at the outer peripheral region of the light transmitting substrate are to be smaller than those at the inner peripheral region thereof. Consequently, the groove at the outer peripheral region of the stamper can be more easily filled by the resin during injection molding. More specifically, the sloping angles at both sides of the tracking groove at the inner and the outer peripheral regions are within a range from about 55° to about 75° and, within this range, the sloping angles at the outer peripheral region are made to be smaller than those at the inner peripheral region.

In accordance with the present invention, a leveling index $L(=1-B/A)$ is preferably to be within the range of about $0.2 \leq L \leq$ about 0.5 throughout the inner and the outer peripheral regions of the light transmitting substrate, wherein L represents a degree of leveling of the recording layer; A, a depth of the tracking groove on the substrate; and B, a depth of the recording layer, both being measured at an identical location (shown in FIGS. 4 and 5).

Therefore, as the leveling of the recording layer is more pronounced, i.e., as the recording layer becomes more flattened or planarized, the difference between the depth A of the pre-groove and the depth B of the recording layer becomes greater and thus the value L increases. If L is equal to zero, it means that the recording layer is not leveled at all and thus the depth A of the pre-groove is identical to the depth B of the recording layer. On the other hand, the value of L=1 means that the recording layer is perfectly leveled and thus the depth B of the recording layer is zero.

If L is within the range from about 0.2 to about 0.5, the reflectance of the optical information recording medium becomes higher and the amplitudes of the push-pull signals for the tracking servo remain favorable. On the other hand, if L is less than about 0.2, the reflectance of the optical information recording medium becomes low and if L is greater than about 0.5, it is difficult to obtain the desired amplitudes of the push-pull signals.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, embodiments of the present invention will be explained in detail with reference to the drawings.

Figure 1:
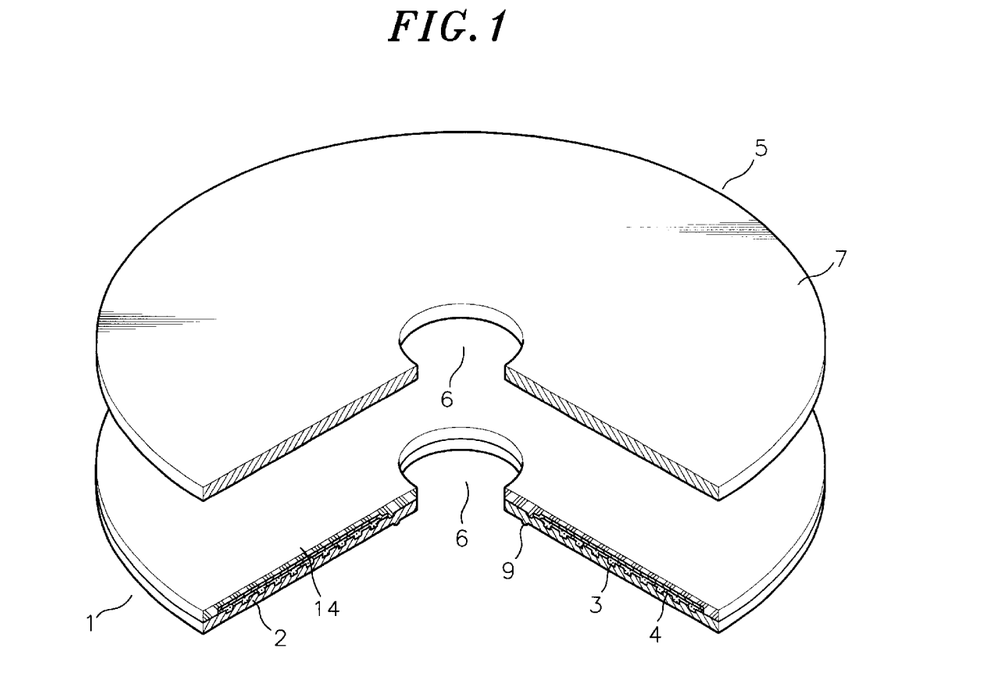
FIG. 1 illustrates a cross sectional perspective view of two discs before being bonded together to construct an exemplary optical information recording medium.
Figure 2:
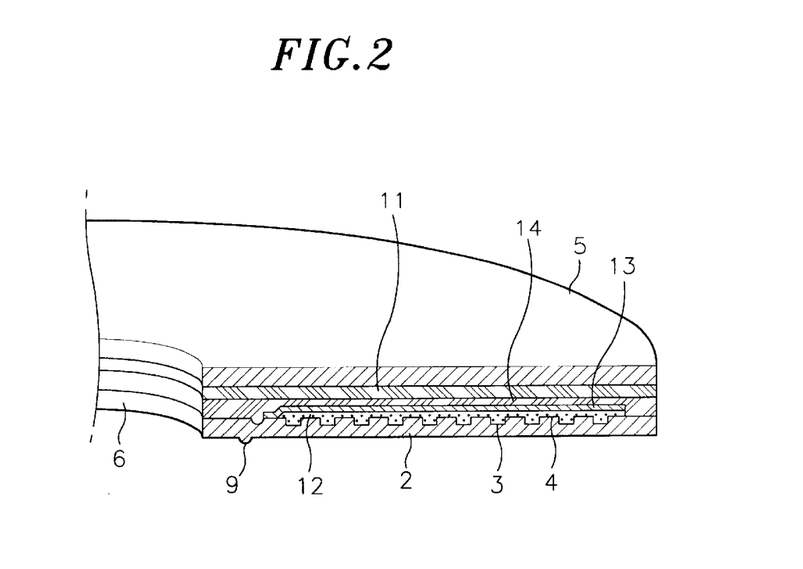
FIG. 2 shows a partial cross sectional perspective view of the exemplary optical information recording medium.

An optical information recording medium in accordance with the present invention is described with reference to FIGS. 1 and 2 by exemplifying a write once type optical information recording medium having a structure in which two discs are bonded together and optical information is recorded and reproduced on and from one side.

A light transmitting substrate 2 of a disc 1 is of a transparent circular plate-shaped structure having a hole 6 at the center thereof. The light transmitting substrate 2 is most preferably formed of a transparent resin such as polycarbonate or polymethylmetacrylate (PMMA).

The light transmitting substrate 2 is generally formed by employing an injection molding scheme. In the injection molding process, a stamper is used to transfer a groove therefrom onto a surface of the light transmitting substrate 2. An exemplary method of providing such a stamper will be described hereinafter.

First, a photoresist is spin-coated on a flat surface of a glass substrate with a film thickness of about 0.1 $\mu$m to about 0.2 $\mu$m and then dried. Groove cutting is carried out by irradiating an ultraviolet (UV) laser beam on the glass substrate coated with the photoresist and then the glass substrate is developed. In this process, by continuously varying an intensity of the laser beam, it is possible to change the widths of the groove at an inner and an outer peripheral region of the glass substrate in order to provide the light transmitting substrate 2, which will be described in detail hereinafter. After the groove cutting and developing processes, a metal film such as Ni is formed on the surface of the glass substrate by means of, e.g., a sputtering process and then electroplating is carried out thereon.

Referring back to FIGS. 1 and 2, on a surface of the light transmitting substrate 2 fabricated by using the stamper described above, there is provided a clamping area outside the center hole 6. An outer peripheral portion of the clamping area serves as an information recording area. On the information recording area, there is formed a tracking groove 3 having a continuous spiral shape. In the region between two radially adjacent tracks of the tracking groove 3, there is formed a land 4. A pitch of the tracking groove 3 is normally set to be about 0.74 μm. In addition, land pre-pits may be formed on the surface of the land 4.

Figure 4:
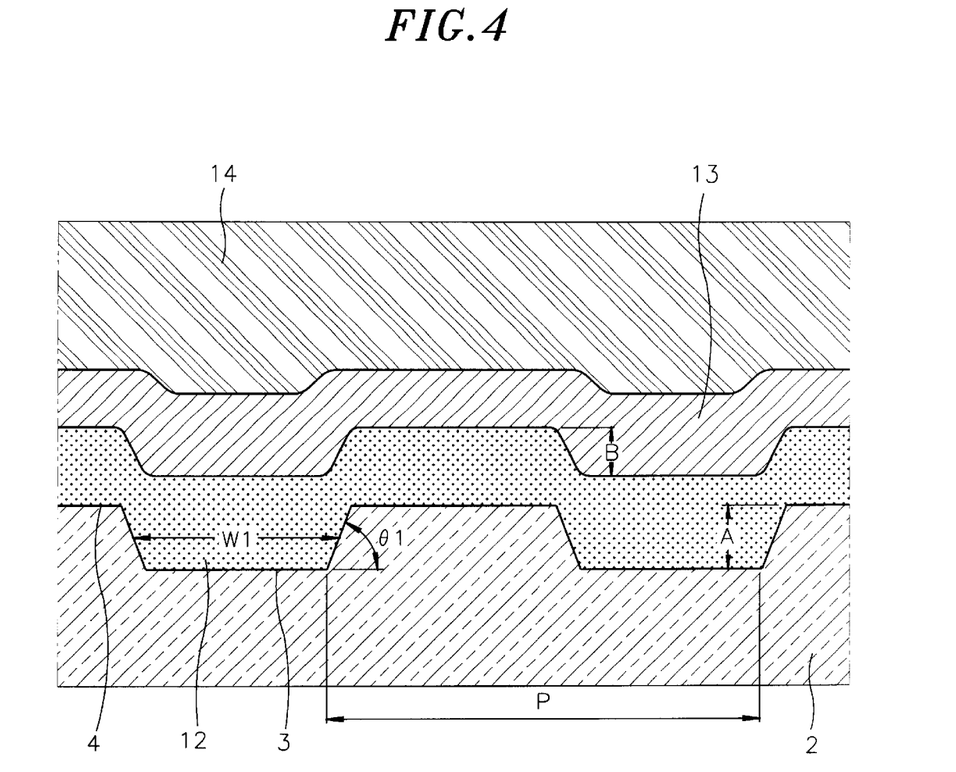
FIG. 4 describes an enlarged cross sectional view representing dimensions and angles in an inner peripheral region of the recording area.
Figure 5:
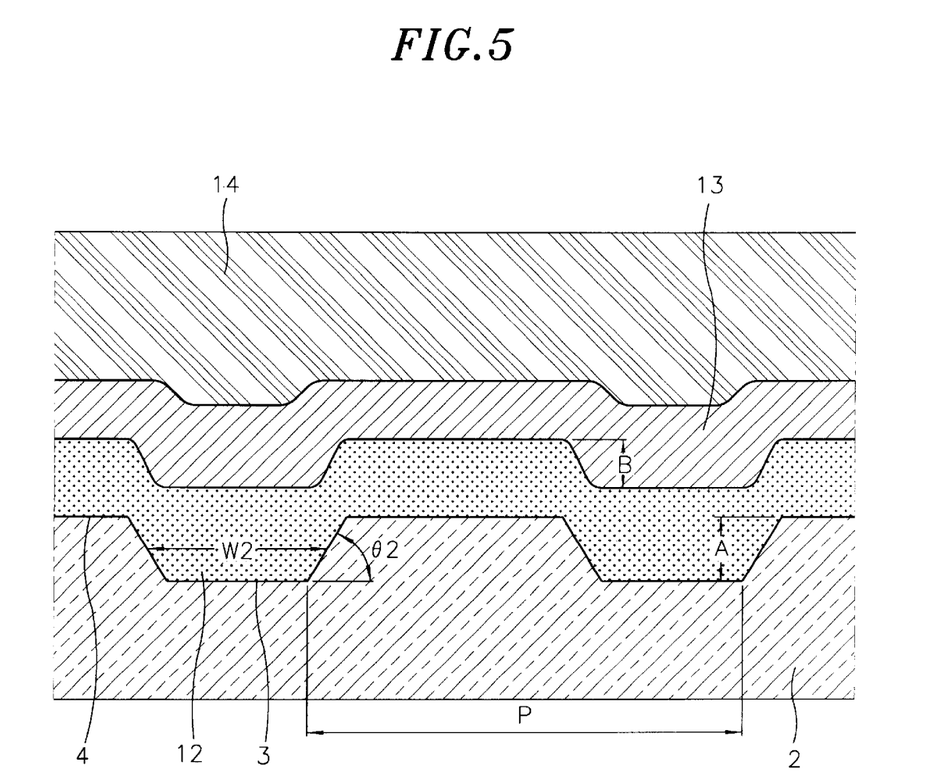
FIG. 5 depicts an enlarged cross sectional view representing dimensions and angles in an outer peripheral region of the recording area.

An FWHM (full width half maximum) W2 of the tracking groove 3 at an outer peripheral region of the information recording area is smaller than an FWHM W1 of the tracking groove 3 at an inner peripheral region of the information recording area. Referring to FIGS. 4 and 5, there are illustrated cross sectional views of the optical information recording medium at the inner and the outer peripheral regions of the light transmitting substrate 2, respectively. In FIGS. 4 and 5, the FWHM of the tracking groove 3 at the inner peripheral region of the light transmitting substrate 2 is represented as W1 and that at the outer peripheral region is depicted as W2, wherein W1 is greater than W2.

Each side of the tracking groove 3 has a sloping angle such that the width of the tracking groove 3 increases from a value at its bottom to a value at a boundary between the groove 3 and its adjacent land 4. The FWHM of the tracking groove 3 represents its width at a half of the depth thereof.

The tracking groove 3 has a constant pitch P of about 0.74 μm throughout the inner and the outer peripheral regions of the light transmitting substrate 2. However, as described above, the FWHMs of the tracking groove 3 at the inner peripheral region are different from those at the outer peripheral region.

In a preferred embodiment of the invention, the width W1 of the tracking groove 3 at the inner peripheral region of the light transmitting substrate 2 is within a range of about 0.28±0.04 μm, i.e., about 0.24~0.32 μm and the width W2 of the tracking groove 3 at the outer peripheral region is within a range of about 0.26±0.04 μm, i.e., about 0.22~0.30 μm. Within these ranges, the width W2 is preferably set to be smaller than the width W1. It is also preferable that a ratio of the width W2 to the width W1, W2/W1, should be greater than or equal to about 0.8.

The sloping angles of the both side surfaces of the tracking groove 3 to the plane of incidence of the recording laser beam can be set to be constant throughout the inner and the outer peripheral regions of the light transmitting substrate 2. It is, however, preferable to make the sloping angle $\theta 2$ at the outer peripheral region to be smaller than the sloping angle $\theta 1$ at the inner peripheral region. By modifying the sloping angle $\theta 2$ in such a manner, the resin can easily fill the outer peripheral region of the substrate 2 during the injection molding process. It is more preferable to set the sloping angles at both sides of the tracking groove 3 to fall within a range from about 55° to about 75° and, in this range, the sloping angle $\theta 2$ at the outer peripheral region is set to be smaller than the sloping angle $\theta 1$ at the inner peripheral region.

It is also preferable that the width of the tracking groove 3 gradually decreases as the tracking groove 3 moves from the inner peripheral region to the outer peripheral region. The width of the tracking groove 3 can be changed by, e.g., gradually varying the intensity of the laser beam used in the groove cutting process described above or adjusting a dipping time of the glass substrate in a developer or the amount of the developer while fabricating the stamper.

Figure 6:
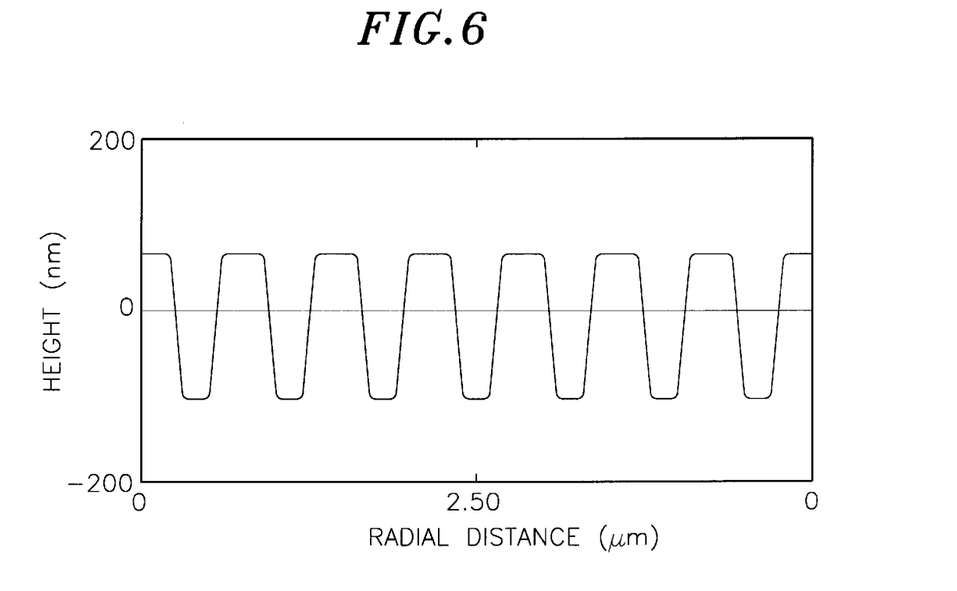
FIG. 6 presents an AFM measurement result along the radial direction of the surface of a light transmitting substrate of the optical information recording medium.

Referring to FIG. 6, there is illustrated a cross sectional profile of the groove 3 and the land 4 obtained by scanning the surface of the light transmitting substrate 2 along the radial direction thereof by using an AFM (Nanoscope IIIa atomic force microscope from Digital Instruments, Inc.). In the drawing, the valleys represent the tracking groove 3 and the peaks between the valleys correspond to the land 4.

Returning to FIGS. 1 to 5, a recording layer 12 is formed on the surface of the light transmitting substrate 2 having the tracking groove 3. Specifically, the recording layer 12 is formed by, e.g., spin-coating an organic dye on the surface of the light transmitting substrate 2. During this process, a leveling index L can be adjusted by physical properties, e.g., viscosity, of the organic dye and/or spin-coating conditions.

Then, a reflective layer 13 is formed on the recording layer 12, wherein the reflective layer 13 is made of a metal such as gold, aluminum, silver, copper or the like, or an alloy thereof. The reflective layer 13 is covered with a protection layer 14 made of a UV-curable resin or the like.

Figure 7:
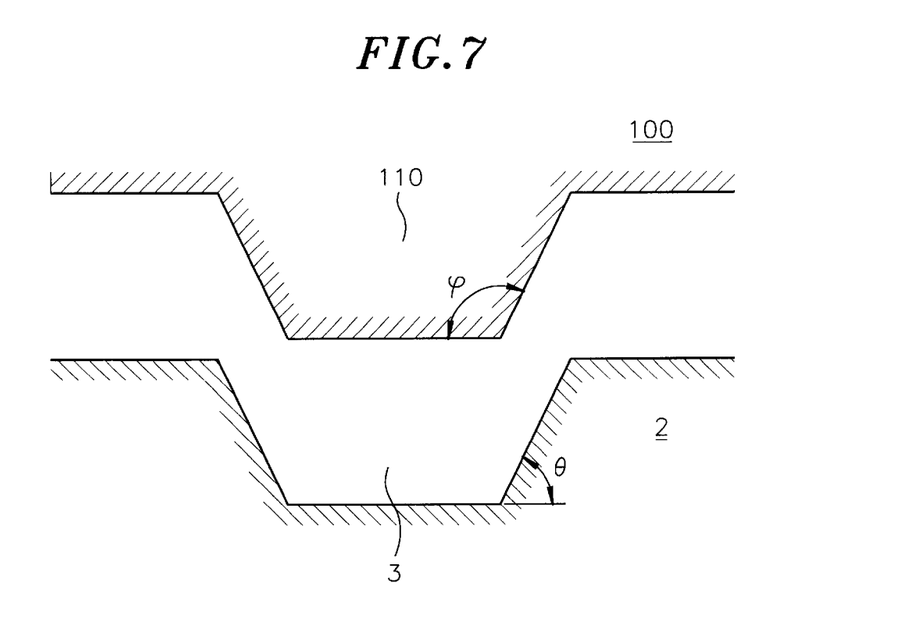
FIG. 7 is a cross sectional view of a stamper and a substrate corresponding to the stamper.

Referring to FIG. 7, there is shown a cross sectional view of the light transmitting substrate 2 and a stamper 100 for forming the substrate 2.

The stamper 100 is provided with a land 110 corresponding to the tracking groove 3 of the light transmitting substrate 2. As in the widths of the groove 3 of the light transmitting substrate 2, a width of the land 110 at an outer peripheral region of the stamper 100 is smaller than that of the land 110 at an inner peripheral region of the stamper 100. A ratio of the width of the land 110 at the outer peripheral region to the width of the land 110 at the inner peripheral region is also greater than or equal to about 0.8. Further, the stamper 100 has a top surface and two side surfaces with a sloping angle φ between the top surface and each of the side surfaces, wherein a sloping angle φ at the outer peripheral region is greater than that at the inner peripheral region. The sloping angles φ of the stamper 100 are within the range from about 105° to about 125°, so that every single sloping angle θ of the groove 3 of the light transmitting substrate 2 produced by the stamper 100 is made to be within the range from about 55° to about 75°.

Now, along with the disc 1, there is provided one more disc 5 having a substrate 7. The substrate 7 may be made of the same material and have the same size as those of the light transmitting substrate 2. The disc 5 may not be provided with a recording layer and a reflective layer on a surface thereof as in the disc 1. However, it is also possible for the disc 5 to include a recording layer and a reflective layer thereon as in the disc 1.

Figure 3:
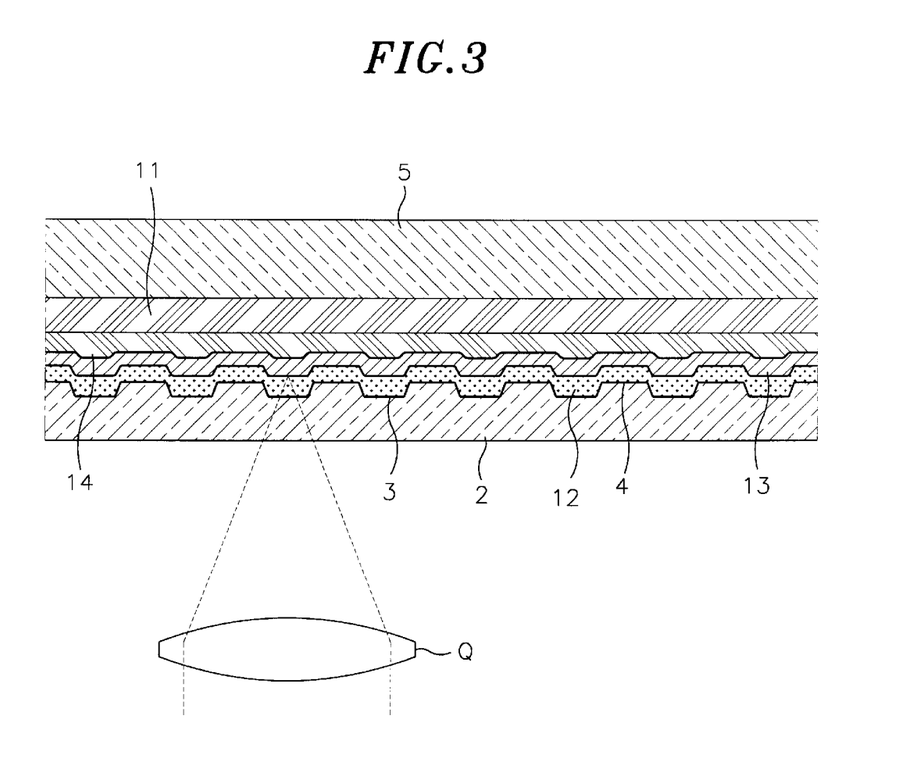
FIG. 3 provides a cross sectional view of a recording area of the exemplary optical information recording medium.

Next, the two discs 1 and 5 are bonded together. For instance, a reactive curable resin serving as an adhesive layer 11 shown in FIGS. 2 and 3 is coated on the main surface of at least one of the two discs 1 and 5 by means of the spin-coating or a screen printing method. The two discs 1 and 5 are then overlapped with each other having the adhesive layer 11 therebetween and are bonded together by the adhesive layer 11 being cured. In this case, the surface of the disc 1 having the protection layer 14 is bonded to the disc 5.

The above example shows a case where the disc 1, including the recording layer 12 and the reflective layer 13 formed on the substrate 2 having the tracking groove 3, and the other disc 5, including no recording and reflective layers therein, are bonded together. In such a case, optical information can be recorded on and reproduced from only one surface of the bonded discs. The other disc 5 may be provided with a non-transparent substrate, or may be colored for improving light resistance, or may have an area where characters or patterns can be written.

Alternatively, both of the two discs may be provided with recording layers and reflective layers formed on light transmitting substrates both having tracking grooves. Then these two discs are bonded together with the transmitting substrates facing outside, thereby forming an optical information recording medium capable of recording and reproducing optical information at both surfaces thereof.

Referring back to FIGS. 1 and 2, a protrusion 9 is provided on the surface of the light transmitting substrate 2 upon which the recording beam is incident. The protrusion 9 is of a ring shape arranged between the hole 6 and the information recording area. The protrusion 9 serves to prevent the surfaces of stacked optical information recording mediums from contacting with each other.

Now, the present invention will be described in further detail with reference to Examples. However, it should be understood that the present invention is by no means restricted to such specific Examples.

EXAMPLE 1

In order to generate a stamper, first, a photoresist of a given thickness was spincoated on the surface of a flat glass substrate and then dried. The thickness of the photoresist film was 150 nm. Then, groove cutting was performed on the glass substrate coated with the photoresist film by using a UV laser beam while continuously varying them intensity thereof. After performing the developing process, a Ni film was formed on the surface of the glass substrate by means of a sputtering process and electroplating was carried out thereon.

By injection-molding polycarbonate employing the stamper provided as described above, a polycarbonate substrate serving as the light transmitting substrate 2 was fabricated with the tracking groove 3 of the continuous spiral shape on its main surface, the substrate having an outer diameter of 120 mm$\phi$, an inner diameter of 15 mm$\phi$, a thickness of 0.597 mm and a refractive index of 1.59. The FWHM W1 of the groove at the inner peripheral region was 0.30 $\mu$m; the FWHM W2, 0.29 $\mu$m; the ratio W2/W1, 0.97; the sloping angle $\theta1$ at the inner peripheral region, 68°; the sloping angle $\theta2$ at the outer peripheral region, 65°; the depth A, 148 nm; and the tracking pitch P, 0.74 $\mu$m. The FWHM and the sloping angle of the groove gradually decreased as moving from the inner peripheral region to the outer peripheral region of the light transmitting substrate.

Then, the recording layer 12 was formed by spin-coating a cyanine dye solution on the surface of the light transmitting substrate 2 having the tracking groove 3. In this example, the leveling index L(=1−B/A) of the recording layer 12 was 0.30.

Next, the reflective layer 13 was formed on the recording layer 12 by sputtering Au. The protection layer 14 was then formed by spin-coating the UV-curable resin (SD211 from Dainippon Inks Mfg. Co., Ltd.) on the reflective layer 13 and curing the resin through the irradiation of UV rays. Finally, an optical information recording medium was provided by coating a UV-curable resin-based adhesive on the protection layer 14; placing a second substrate thereon, the second substrate being of the same material and shape as those of the light transmitting substrate 2 but devoid of a groove, a recording layer and a reflective layer thereon; and irradiating UV rays so as to cure the adhesive, the surface of the light transmitting substrate 2 having the protection layer 14 being bonded to the second substrate.

EFM(eight to fourteen modulation)-Plus signals (8–16 modulation signals) were recorded on the optical information recording medium provided as described above with a wavelength of 635 nm and a recording power of 10 mW through the use of an optical pick-up having an object lens Q (shown in FIG. 3) with a numerical aperture (NA) of 0.6. In this case, the amplitudes of the push-pull signals were 0.28 and 0.25 at the inner and the outer peripheral regions of the optical information recording medium, respectively. These amplitudes are within a range of ±5.7% of the average amplitude, 0.265, of the push-pull signals determined for the DVD. From the optical information recording medium described above, preferable results were obtained as follows: the degree of modulation of signals recorded on the optical information recording medium was 64%; the maximum value of errors in the lengths of pits and lands for each signal was 6.0 ns; a jitter was 7.5%; and a reflectance was 65%.

EXAMPLE 2

In this example, an optical information recording medium was fabricated in a similar manner as in the first example with some modifications as follows: the FWHM W1 was 0.31 $\mu$m; the FWHM W2, 0.25 $\mu$m; the ratio W2/W1, 0.81; the sloping angle $\theta1$, 65°; and the sloping angle $\theta2$, 57°. The processing conditions for forming the recording layer 12 were changed to result in the leveling index L(=1−B/A) of 0.25.

EFM-Plus signals were recorded on the optical information recording medium fabricated as described above with a wavelength of 638 nm and a recording power of 12 mW by using an optical pick-up having an object lens Q with an NA of 0.65. The amplitudes of the push-pull signals were 0.28 and 0.23 at the inner and the outer peripheral regions of the optical information recording medium, respectively. These amplitudes fall within a range of ±9.8% of the average amplitude, 0.255, of the push-pull signals determined for the DVD. Preferable results were also obtained from the optical information recording medium as follows: the degree of modulation of signals recorded on the optical information recording medium was 75%; the maximum value of errors in the lengths of pits and lands for each signal was 5.0 ns; a jitter was 6.7%; and a reflectance was 58%.

EXAMPLE 3

In this example, an optical information recording medium was fabricated in a similar manner as in the first example with some modifications as follows: the FWHM W1 was 0.28 $\mu$m; the FWHM W2, 0.27 $\mu$m; the ratio W2/W1, 0.96; the sloping angle $\theta1$, 74°; and the sloping angle $\theta2$, 70°. The processing conditions for forming the recording layer 12 were varied to have the leveling index L(=1−B/A) of 0.25.

EFM-Plus signals are recorded on the optical information recording medium as fabricated described above with a wavelength of 655 nm and a recording power of 12 mW by using an optical pick-up having an object lens Q with an NA of 0.6. The amplitudes of the push-pull signals were 0.27 and 0.24 from the inner and the outer peripheral regions of the optical information recording medium, respectively. These amplitudes are within a range of ±5.9% of the average amplitude, 0.255, of the push-pull signals determined for the DVD. Preferable results were also obtained from the optical information recording medium as follows: the degree of modulation of signals recorded on the optical information recording medium was 75%; the maximum value of errors in the lengths of pits and lands for each signal was 5.0 ns; a jitter was 6.7%; and a reflectance was 58%.

Comparative Example 1

In this example, an optical information recording medium was fabricated in a similar manner as in the first example with some modifications as follows: W1=W2=0.34 μm and θ1=θ2=56°. The leveling index L(=1−B/A) of the recording layer 12 was 0.30.

Recording of EFM-Plus signals on the medium with a wavelength of 635 nm and a recording power of 10 mW by using an optical pick-up having an object lens Q with an NA of 0.6 resulted in tracking servo errors at the outer peripheral region of the substrate, so that the signals could not be recorded. In this case, the amplitudes of the push-pull signals were 0.26 and 0.18 from the inner and the outer peripheral regions of the optical information recording medium, respectively. These amplitudes deviate by about ±18.2% from the average amplitude, 0.22, of the push-pull signals. Further, the reflectance of the optical information medium was 65%.

Comparative Example 2

In this example, an optical information recording medium was fabricated in a similar manner as in the first example with some variations as follows: the FWHM W1 was 0.30 μm; the FWHM W2, 0.32 μm; the sloping angle θ1, 57°; and the sloping angle θ2, 53°. The processing conditions for forming the recording layer 12 were modified, resulting in the leveling index L(=1−B/A) of 0.53.

Recording of EFM-Plus signals on the medium with a wavelength of 635 nm and a recording power of 10 mW by using an optical pick-up having the object lens Q with an NA of 0.6 resulted in tracking servo errors at the outer peripheral region of the substrate, so that the signals could not be recorded. In this case, the amplitudes of the push-pull signals were 0.23 and 0.14 from the inner and the outer peripheral regions of the optical information recording medium, respectively. These amplitudes deviate by about ±24.3% from the average amplitude, 0.185, of the push-pull signals. Further, the reflectance of the optical information recording medium was 68%.

Comparative Example 3

In this example, an optical information recording medium was fabricated in a similar manner as in the first example with some changes as follows: W1=W2=0.34 μm and θ1=θ2=56°. The processing conditions for forming the recording layer 12 were modified, resulting in the leveling index L(=1−B/A) of 0.17.

In recording of EFM-Plus signals on the medium with a wavelength of 655 nm and a recording power of 12 mW by using an optical pick-up having the object lens Q with an NA of 0.6, the tracking servo was unstable in the outer peripheral region of the substrate, so that the recorded signals could not be reproduced. In this case, the amplitudes of the push-pull signals were 0.38 and 0.23 from the inner and the outer peripheral regions of the optical information recording medium, respectively. These amplitudes deviate by about ±24.5% from the average amplitude, 0.35, of the push-pull signals, which lie outside the preferred range. The reflectance of the optical information medium was less than 41%.

As described above, the optical information recording medium of the present invention is capable of recording optically reproducible high-density signals thereon while enabling accurate tracking servo to be performed throughout the whole recording area from the inner to the outer peripheral regions thereof by way of reducing differences between the amplitudes of the push-pull signals therefrom.

While the present invention has been described witch respect to the particular embodiments, it will be apparent to those skilled in the art that various changes and modifications may be made without departing from the spirit and scope of the invention as defined in the following claims.

What is claimed is:

1. An optical information recording medium for recording optically readable signals thereon by using a laser beam, comprising:
   a light transmitting substrate,
   a tracking groove formed on a surface of the light transmitting substrate, the surface having an inner peripheral region and an outer peripheral region;
   a recording layer formed on the surface having the tracking groove, and
   a reflective layer, formed on the recording layer, for reflecting the laser beam,
   wherein a width W1 of the groove at the inner peripheral region is greater than a width W2 at the outer peripheral region, and
   wherein an index L is defined as 1−B/A and is within the range from about 0.2 to about 0.5 throughout the inner and the outer peripheral regions, A being a depth of the tracking groove and B being a depth of the recording layer at a same position from a plane view point of the recording layer.

2. The optical information recording medium as recited in claim 1, wherein a ratio of the width W2 to the width W1 is greater than or equal to about 0.8.

3. The optical information recording medium as recited in claim 1, wherein the groove has a first sloping angle representing an angle between a side surface of the groove and a plane of incidence of the laser beam at the inner peripheral region and a second sloping angle representing an angle between a side surface of the groove and a plane of incidence of the laser beam at the outer peripheral region, the first sloping angle being greater than the second sloping angle.

4. The optical information recording medium as recited in claim 2, wherein the groove has a first sloping angle representing an angle between a side surface of the groove and a plane of incidence of the laser beam at the inner peripheral region and a second sloping angle representing an angle between a side surface of the groove and a plane of incidence of the laser beam at the outer peripheral region, the first sloping angle being greater than the second sloping angle.

5. The optical information recording medium as recited in claim 1, wherein a sloping angle, representing an angle between a side surface of the groove and a plane of incidence of the laser beam, is within the range from about 55° to about 75°.

6. The optical information recording medium as recited in claim 2, wherein a sloping angle, representing an angle between a side surface of the groove and a plane of incidence of the laser beam, is within the range from about 55° to about 75°.

7. The optical information recording medium as recited in claim 3, wherein the first and the second sloping angles are within the range from about 55° to about 75°.

8. A light transmitting substrate, having a tracking groove formed on a surface thereof, to be used in manufacturing an optical information recoding medium having a recording layer formed on the surface having the tracking groove, wherein a width W1 of the tracking groove at an inner peripheral region of the substrate is greater than a width W2 at an outer peripheral region of the substrate, wherein an index L is defined as 1−B/A and is within the range from about 0.2 to about 0.5 throughout the inner and the outer peripheral regions, A being a depth of the tracking groove and B being a depth of the recording layer at a same position from a plane view point of the recording layer.

9. The light transmitting substrate as recited in claim 8, wherein a ratio of the width W2 to the width W1 is greater than or equal to about 0.8.

10. The light transmitting substrate as recited in claim 8, wherein the groove has a first sloping angle representing an angle between a side surface of the groove and a plane of incidence of laser beam at the inner peripheral region and a second sloping angle representing an angle between a side surface of the groove and a plane of incidence of laser beam at the outer peripheral region, the first sloping angle being greater than the second sloping angle.

11. The light transmitting substrate as recited in claim 9, wherein the groove has a first sloping angle representing an angle between a side surface of the groove and a plane of incidence of laser beam as the inner peripheral region and a second sloping angle representing an angle between a side surface of the groove and a plane of incidence of laser beam at the outer peripheral region, the first sloping angle being greater than the second sloping angle.

12. The light transmitting substrate as recited in claim 8, wherein a sloping angle, representing an angle between a side surface of the groove and a plane of incidence of laser beam, is within the range from about 55° to about 75°.

13. The light transmitting substrate as recited in claim 9, wherein a sloping angle, representing an angle between a side surface of the groove and a plane of incidence of laser beam, is within the range from about 55° to about 75°.

14. The light transmitting substrate as recited in claim 10, wherein the first and the second sloping angles are within the range from about 55° to about 75°.

15. A stamper for forming a light transmitting substrate, having a tracking groove formed on a surface of the light transmitting substrate, to be used in fabricating an optical information recording medium having recording layer formed on the surface having the tracking groove, comprising a land corresponding to the tracking groove of the light transmitting substrate, the land being formed on the stamper, wherein a width W1 of the land at an inner peripheral region of the stamper is greater than that a width W2 of the land at an outer peripheral region of the stamper, wherein an index L is defined as 1−B/A and is within the range from about 0.2 to about 0.5 throughout the inner and the outer peripheral regions, A being a depth of the tracking groove and B being a depth of the recording layer at a same position from a plane view point of the recording layer.

16. The stamper as recited in claim 15, wherein a ratio of the width W2 to the width W1 is greater than or equal to about 0.8.

17. The stamper as recited in claim 15, wherein the land has a top surface and two side surfaces with a sloping angle between the top surface and each of the side surfaces, a sloping angle at the outer peripheral region being greater than that at the inner peripheral region.

18. The stamper is recited in claim 15, wherein the land has a top surface and two side surfaces with a sloping angle between the top surface and each of the side surfaces, the sloping angle being within the range from about 105° to about 125°.

19. A method for recording information on the optical information recording medium of claim 1, wherein recording is conducted by irradiating a laser beam through the substrate side.

\* \* \* \* \*